(No Model.)
J. H. H. TAYLOR.
Car Brake and Starter.
No. 230,506. Patented July 27, 1880.
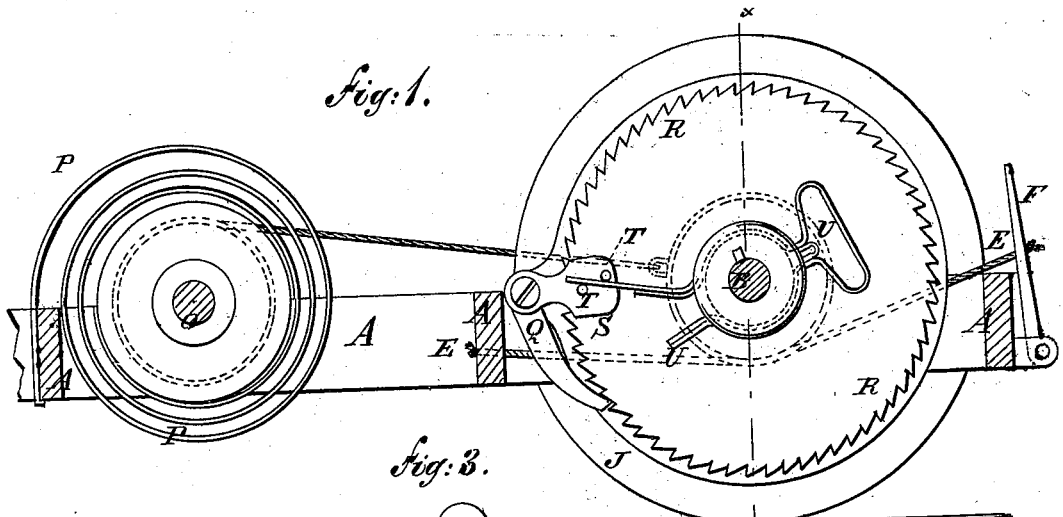
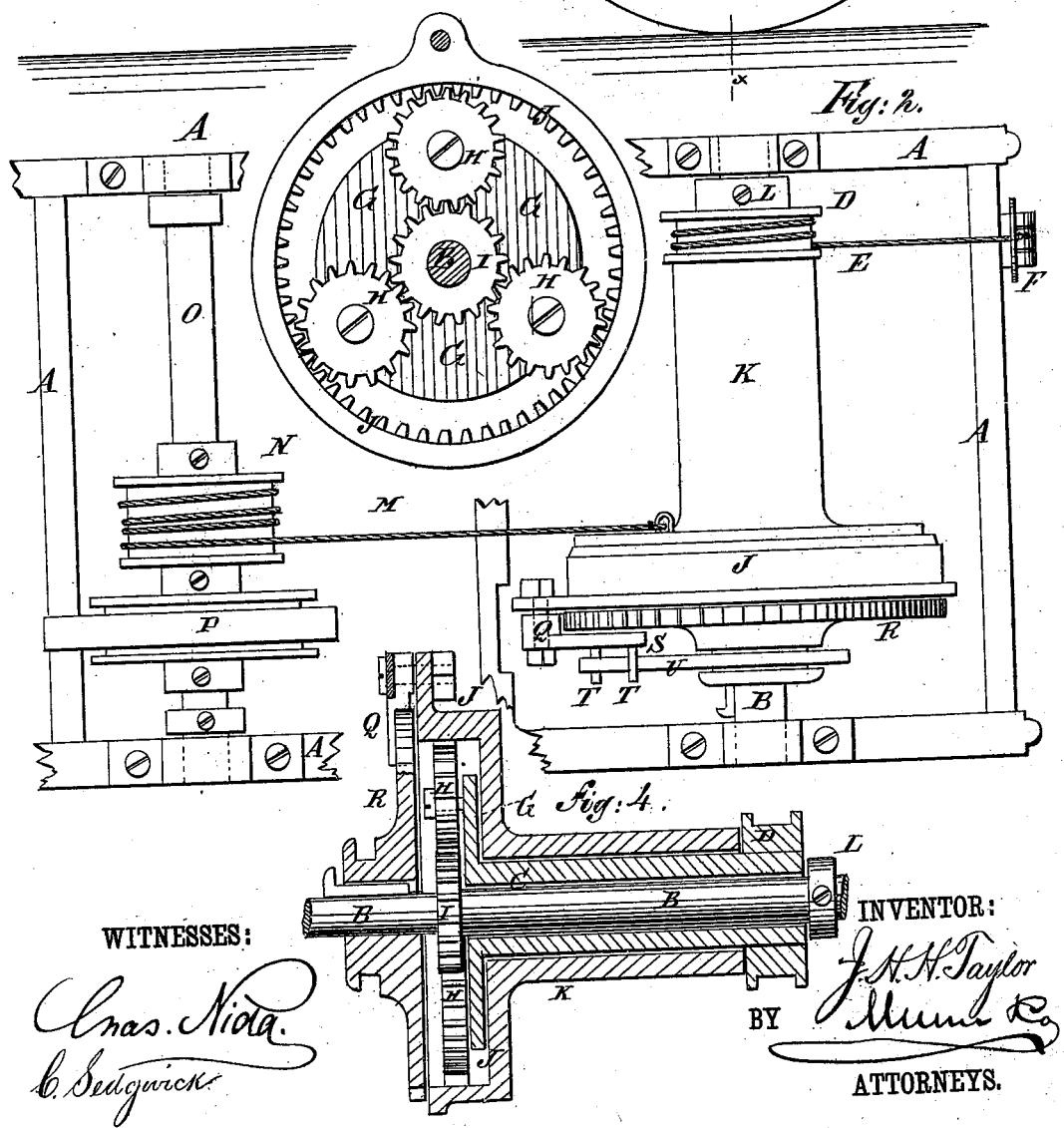
WITNESSES:
Chas. Nida
C. Sedgwick
INVENTOR:
J. H. H. Taylor
BY Munn & Co.
ATTORNEYS.

UNITED STATES PATENT OFFICE.

JAMES H. H. TAYLOR, OF LAWRENCE, MASSACHUSETTS.

CAR BRAKE AND STARTER.

SPECIFICATION forming part of Letters Patent No. 230,506, dated July 27, 1880.

Application filed June 7, 1880. (No model.)

*To all whom it may concern:*

Be it known that I, JAMES H. H. TAYLOR, of Lawrence, in the county of Essex and State of Massachusetts, have invented a new and Improved Mechanism for Stopping and Starting Street-Cars, of which the following is a specification.

Figure 1 is a sectional side elevation of the improvement. Fig. 2 is a plan view. Fig. 3 is a side elevation of the gearing, the ratchet-wheel being removed. Fig. 4 is a sectional elevation taken through the line $x\,x$, Fig. 1.

The object of this invention is to furnish a mechanism for stopping and starting street-cars, so constructed that the momentum of the car can be used for stopping the car, stored up, and again used for starting the car, and which shall be simple in construction and convenient in use.

The invention consists in constructing a mechanism for stopping and starting street-cars of a brake, a sleeve having brake-wheel and flange, a sleeve having internally-toothed gear-wheel, the gear-wheels connected with the inner sleeve and the axle, the rope, drum, and coiled spring, the pawl having arm and pins, the ratchet-wheel, and the spring, whereby the forward movement of the car is made to coil a spring and stop the car, and the uncoiling of the spring is made to start the car, as set forth.

A represents the frame of a car. B represents an axle, which is designed to be connected with the frame A and be provided with wheels in the ordinary manner. Upon the axle B is placed a sleeve, C, to one end of which is attached a brake-wheel, D. Around the brake-wheel D are passed two or three coils of a rope, E, one end of which is attached to a bar of the frame A, and its other end is attached to a lever, F. One end of the lever F is pivoted to the frame A, and its other end projects into such a position that it may be conveniently reached and operated by the driver.

With this construction, when the car is moving the sleeve C runs free, but when the lever F is operated the sleeve C will be held stationary.

I have described the sleeve C as being held by a rope and lever; but any other convenient kind of brake may be used for that purpose. Upon the other end of the sleeve C is formed a ring-flange, G, to which are pivoted three gear-wheels, H, equal in size and at points equally distant from each other. The teeth of the three gear-wheels H mesh into the teeth of the gear-wheel I, keyed to or otherwise rigidly connected with the axle B. The teeth of the three gear-wheels H also mesh into the teeth of the internally-toothed gear-wheel J, attached to or formed upon the end of the sleeve K, placed upon the sleeve C. The sleeve C is kept from longitudinal movement upon the shaft B by the gear-wheel I and by the collar L, secured to the said shaft B by a set-screw or other suitable means. The sleeve K is kept from longitudinal movement upon the sleeve C by the flange G and the brake-wheel D.

With this construction, when the car is moving and the sleeve C is held stationary the gear-wheels H I J cause the sleeve K to revolve, and when the sleeve K is held stationary the said gear-wheels cause the sleeve C to revolve. To the sleeve K is attached the end of a rope, M, which is wound upon and has its other end attached to a drum, N, attached to the shaft O. The shaft O revolves in bearings attached to the frame A, and around it is coiled a spring, P, one end of which is attached to the shaft O and its other end is attached to the frame A. The spring P is so arranged that it will be coiled by the unwinding of the rope M, and by its uncoiling it will wind up the said rope M.

With this construction, when the sleeve K is turned by the gear-wheels H I J the rope M will be wound upon the sleeve K and the spring P will be coiled by the momentum of the car, the sleeve K turning in the opposite direction from the axle B. When the sleeve C is released the tension of the spring P will turn the sleeve K in the opposite direction, or in the same direction as the axle B.

To a flange or other support formed upon or attached to the rim of the internally-toothed gear-wheel J is pivoted a pawl, Q, which engages with the teeth of a ratchet-wheel, R, keyed or otherwise secured to the axle B, so that the power of the spring P will be exerted upon the axle B in such a direction as will turn the said axle B forward and start the car. Upon the pawl Q is formed, or to it is attached, an arm, S, which projects along the side of the ratchet-wheel R, and has two pins, T, attached to it at different distances from its ends, and in such positions as to receive the spring U between them.

The spring U is made with a fork, which rides in a ring-groove in the hub of the ratchet-wheel R, and has so much friction that the force required to move it upon the hub of the ratchet-wheel R will be sufficient to raise the engaging end of the pawl Q away from the teeth of the said ratchet-wheel R.

With this construction, when the sleeve C is free, and the sleeve K is held from turning by the rope M and spring P, the pawl Q S T, being stationary, will hold the spring U from turning with the ratchet R, and the friction of spring U in its groove will hold the engaging end of the pawl Q away from the teeth of the ratchet-wheel R, and will thus prevent noise from the said pawl sliding over the ratchet-teeth.

When the sleeve K and wheel J are turned forward by the action of the spring P the pressure of the pins T against the spring U will turn the engaging end of the pawl Q into contact with the teeth of the ratchet-wheel R, so that the power of the spring P will be exerted upon the axle B in the direction to turn the said axle and its wheels forward and thus start the car.

With this construction the horses will be saved from the labor of starting the car, and will thus be able to draw the load with greater ease and rapidity than is possible when the car has to be started solely by the power of the horses.

Having thus described my invention, what I claim as new, and desire to secure by Letters Patent, is—

1. A mechanism for starting and stopping street-cars, constructed substantially as herein shown and described, consisting of a brake, E F, the sleeve C, having brake-wheel D and flange G, the sleeve K, having internally-toothed gear-wheel J, the gear-wheels H I, the rope, drum, and spring M N P, the pawl Q S T, the ratchet-wheel R, and the spring U, as set forth.

2. In a mechanism for stopping and starting street-cars, the combination, with the frame A and axle B, of a brake, E F, the sleeve C, having brake-wheel D and flange G, the sleeve K, having internally-toothed gear-wheel J, the gear-wheels H I, the rope, drum, and spring M N P, the pawl Q, and the ratchet-wheel R, substantially as herein shown and described, whereby the momentum of the car is used for stopping it and is then applied to the car for starting it, as set forth.

3. In a mechanism for stopping and starting street-cars, the combination, with the axle B, the sleeves C K, and the ratchet-wheel R, of the gear-wheels H I J and the pawl Q, substantially as herein shown and described, whereby the forward movement of the axle will turn the sleeve K to coil a spring and the forward movement of the sleeve K will turn the axle B forward to start the car, as set forth.

4. In a mechanism for stopping and starting street-cars, the combination, with the pawl Q, pivoted to the internally-toothed gear-wheel J, and the ratchet-wheel R, of the arm S, having pins T and the spring U, substantially as herein shown and described, whereby the pawl Q is thrown into and out of gear with the ratchet-wheel R by the movements of the gear-wheel J, as set forth.

JAMES HENRY HAUGHTON TAYLOR.

Witnesses:
A. PHELPS,
A. J. SHOVE.